US012761859B2

(12) United States Patent
Zhu et al.

(10) Patent No.: US 12,761,859 B2
(45) Date of Patent: Oct. 13, 2026

(54) TERMINAL PERFORMING CORRECTION ON DISPLAY EFFECT BY IDENTIFYING PROTECTION FILM, CONTROL METHOD THEREFOR, AND STORAGE MEDIUM

(71) Applicants: Beijing BOE Technology Development Co., Ltd., Beijing (CN); BOE Technology Group Co., Ltd., Beijing (CN)

(72) Inventors: Dan Zhu, Beijing (CN); Ran Duan, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/995,892

(22) PCT Filed: May 16, 2023

(86) PCT No.: PCT/CN2023/094590
§ 371 (c)(1),
(2) Date: Jan. 17, 2025

(87) PCT Pub. No.: WO2024/234309
PCT Pub. Date: Nov. 21, 2024

(65) Prior Publication Data
US 2026/0044300 A1 Feb. 12, 2026

(51) Int. Cl.
*G06F 3/147* (2006.01)

(52) U.S. Cl.
CPC .................................... *G06F 3/147* (2013.01)

(58) Field of Classification Search
CPC ....... G06F 3/147; G06F 3/0481; G06V 10/82; H04N 1/603; G01J 3/524; G09G 3/035
See application file for complete search history.

(56) References Cited

U.S. PATENT DOCUMENTS 5,774,230 A * 6/1998 Goto ...................... H04N 1/603
382/167
2013/0286020 A1* 10/2013 Wagar ................... G06F 3/0481
345/428
(Continued)

FOREIGN PATENT DOCUMENTS

CN 107786864 A 3/2018
CN 107888758 A 4/2018
(Continued)

OTHER PUBLICATIONS

International Search Report mailed on Jul. 21, 2023, received for PCT Application PCT/CN2023/094590, filed on May 16, 2023, 6 pages including English Translation.
(Continued)

*Primary Examiner* — Richard J Hong
(74) *Attorney, Agent, or Firm* — XSENSUS LLP

(57) ABSTRACT

A terminal includes: a display panel; a control circuit, connected to the display panel and configured to control the display panel to display an image according to initial display data and target display data generated based on the initial display data and a correction model when receiving a correction instruction and a model instruction, where the model instruction includes identification information matching with the correction model, and the correction model matching with the identification information is a correction model among a plurality of correction models that are preset and different from each other.

17 Claims, 6 Drawing Sheets

(56) References Cited

U.S. PATENT DOCUMENTS

| | | | | |
|---|---|---|---|---|
| 2022/0138986 | A1* | 5/2022 | Wei | G01J 3/524<br>382/157 |
| 2024/0290254 | A1* | 8/2024 | Feng | G09G 3/035 |
| 2024/0311976 | A1* | 9/2024 | Zhao | G06V 10/82 |

FOREIGN PATENT DOCUMENTS

| | | | |
|---|---|---|---|
| CN | 108965592 | A | 12/2018 |
| CN | 109714533 | A | 5/2019 |
| CN | 110942434 | A | 3/2020 |
| CN | 112365860 | A | 2/2021 |
| CN | 114242023 | A | 3/2022 |
| CN | 114518828 | A | 5/2022 |
| CN | 112468793 | B | 6/2022 |
| CN | 115331625 | A | 11/2022 |
| CN | 116013184 | A | 4/2023 |
| WO | 2014035144 | A1 | 3/2014 |

OTHER PUBLICATIONS

Written Opinion mailed on Jul. 21, 2023, received for PCT Application PCT/CN2023/094590, filed on May 16, 2023, 7 pages including English Translation.

* cited by examiner

TERMINAL PERFORMING CORRECTION ON DISPLAY EFFECT BY IDENTIFYING PROTECTION FILM, CONTROL METHOD THEREFOR, AND STORAGE MEDIUM

CROSS REFERENCE TO RELATED APPLICATIONS

The present application is a U.S. national stage of International Application No. PCT/CN2023/094590, filed on May 16, 2023, the entire contents of which are incorporated herein by reference.

TECHNICAL FIELD

The present disclosure relates to the field of display technology, and in particular, to a terminal, a control method for a terminal, and a storage medium.

BACKGROUND

When using a terminal such as a mobile phone, a tablet computer, or the like, a user often uses a protection film to achieve a protection function. Meanwhile, some protection films may also achieve the effects of anti-blue light, peep-proof, or the like. In addition, there is also a protection film with special visual effects, such as a ceramic frosted film. However, the protection film may cause a problem that the display brightness and the color presentation of the terminal are inconsistent with that of the original screen, and the influences of the protection films with different materials on the screen are different.

It should be noted that the information disclosed in the above background part is only used to enhance the understanding of the background of the present disclosure, and therefore may include information that does not constitute the related art known to those of ordinary skill in the art.

SUMMARY

The present disclosure provides a terminal, a control method for a terminal, and a storage medium.

According to an aspect of the present disclosure, there is provided a terminal, including:

- a display panel; and
- a control circuit, connected to the display panel and configured to control the display panel to display an image according to initial display data and target display data generated based on the initial display data and a correction model when receiving a correction instruction.

In some embodiments of the present disclosure, the control circuit is further configured to control the display panel to display an image according to the initial display data and the target display data generated based on the initial display data and the correction model when receiving the correction instruction and a model instruction, wherein the model instruction includes identification information matching with the correction model, and the correction model matching with the identification information is a correction model among plurality of correction models that are preset and different from each other.

In some embodiments of the present disclosure, the control circuit includes:

- a storage circuit, storing with the plurality of correction models; and
- a processing circuit, configured to obtain the correction instruction and the model instruction, and select the correction model matching with the identification information.

In some embodiments of the present disclosure, the control circuit is further configured to control the display panel to generate a setting interface when receiving a setting instruction, and the setting interface includes a first interaction control and a second interaction control; and

- the control circuit is further configured to generate the correction instruction based on an operation of a user on the first interaction control, and generate the model instruction based on an operation of a user on the second interaction control.

In some embodiments of the present disclosure, the correction model is used for performing correction on a display effect of the terminal with a protection film to ensure the display effect of the terminal with the protection film to be consistent with a display effect of the terminal with no protection film.

According to an aspect of the present disclosure, there is provided a control method for a terminal, where the terminal includes a display panel, and the control method includes:

- receiving a correction instruction, and generating target display data according to initial display data and a correction model; and
- controlling the display panel to display an image according to the target display data.

In some embodiments of the present disclosure, receiving the correction instruction, and generating the target display data according to the initial display data and the correction model includes:

- receiving the correction instruction and a model instruction, and selecting, according to identification information of the model instruction, a correction model matching with the identification information from a plurality of correction models that are preset and different from each other, as a target correction model; and
- generating the target display data according to the initial display data and the target correction model.

In some embodiments of the present disclosure, receiving the correction instruction and the model instruction includes:

- receiving a setting instruction, and controlling the display panel to generate a setting interface, wherein the setting interface includes a first interaction control and a second interaction control;
- generating the correction instruction in response to an operation of a user on the first interaction control; and
- generating the model instruction in response to an operation of a user on the second interaction control.

In some embodiments of the present disclosure, in response to determining that the correction instruction is not generated, the second interaction control is locked.

In some embodiments of the present disclosure, the control method further includes:

- obtaining standard display information by performing detection on a standard detection screen displayed by the display panel of the terminal in a state with no protection film;
- converting the standard display information into reference display information by using a correction model, wherein the reference display information is different from the standard display information;
- controlling the display panel to display a reference detection screen according to the reference display information, and obtaining comparison display information by performing detection on the reference detection screen of the display panel of the terminal in a state with a protection film; and updating the correction model according to a difference between the standard display information and the comparison display information until the difference between the comparison display information and the standard display information reaches a specified condition, and outputting the correction model.

In some embodiments of the present disclosure, the control method further includes:

obtaining standard display information by performing detection on a standard detection screen displayed by the display panel of the terminal in a state with no protection film;

converting the standard display information into reference display information by using a correction model, wherein the reference display information is different from the standard display information;

converting the reference display information into target display information by using a degradation model, wherein the target display information is different from the reference display information; and updating the correction model according to a difference between the target display information and the standard display information until the difference between the target display information and the standard display information reaches a specified condition, and outputting the correction model.

In some embodiments of the present disclosure, updating the correction model according to the difference between the target display information and the standard display information includes:

determining correction adjustment information according to the target display information, the standard display information, and a correction loss function; and updating the correction model according to the correction adjustment information.

In some embodiments of the present disclosure, the standard display information includes at least one of brightness information and color information.

In some embodiments of the present disclosure, the control method further includes:

obtaining datum display information by performing detection on a detection screen displayed by the display panel of the terminal in a state with no protection film;

obtaining degradation display information by performing detection on a detection screen displayed by the display panel of the terminal in a state with a protection film;

converting the datum display information into simulation display information by using the degradation model, wherein the simulation display information is different from the datum display information; and updating the degradation model according to a difference between the simulation display information and the degradation display information until the difference between the simulation display information and the degradation display information reaches a specified condition, and outputting the degradation model.

In some embodiments of the present disclosure, updating the degradation model according to the difference between the simulation display information and the degradation display information includes:

determining degradation adjustment information according to the simulation display information, the degradation display information and a degradation loss function; and updating the degradation model according to the degradation adjustment information.

In some embodiments of the present disclosure, at least one of the datum display information, the degradation display information or the simulation display information includes at least one of brightness information or color information According to an aspect of the present disclosure, there is provided non-transitory a computer-readable storage medium having a computer program stored thereon, where the computer program, when executed by a processor, implements the control method according to any one of the above embodiments.

It is to be understood that both the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. Obviously, the accompanying drawings in the following description are merely some embodiments of the present disclosure, and for those of ordinary skill in the art, other drawings may be obtained according to these drawings without creative efforts.

DETAILED DESCRIPTION

Figure 1:
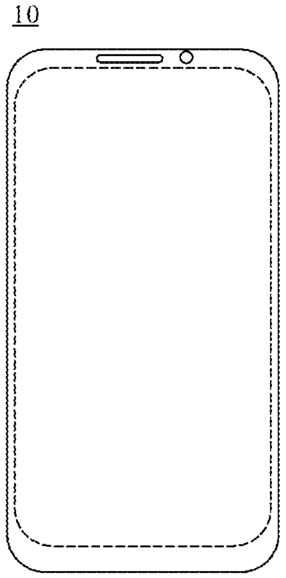
FIG. 1 is a schematic diagram of a terminal according to some embodiments of the present disclosure.

Example embodiments will now be described more fully with reference to the accompanying drawings. However, the example embodiments can be implemented in a variety of forms and should not be construed as limited to the embodiments set forth here. Bu contrast, these embodiments are provided so that the present disclosure will be thorough and complete, and will fully convey the concepts of example implementations to those skilled in the art. The same reference numerals in the drawings denote the same or similar structures, and thus their detailed description will be omitted. In addition, the drawings are merely schematic illustrations of the present disclosure and are not necessarily drawn to scale.

The terms “a”, “an”, “the”, “said” and “at least one” are used to indicate the presence of one or more elements/components/or the like; the terms “comprising” and “having” are used to indicate an open inclusion, and mean that there may be additional elements/components/or the like, in addition to the listed elements/components/or the like; and the terms “first”, “second”, “third”, or the like, are only used as labels, rather than limiting the number of objects in these terms.

Figure 2:
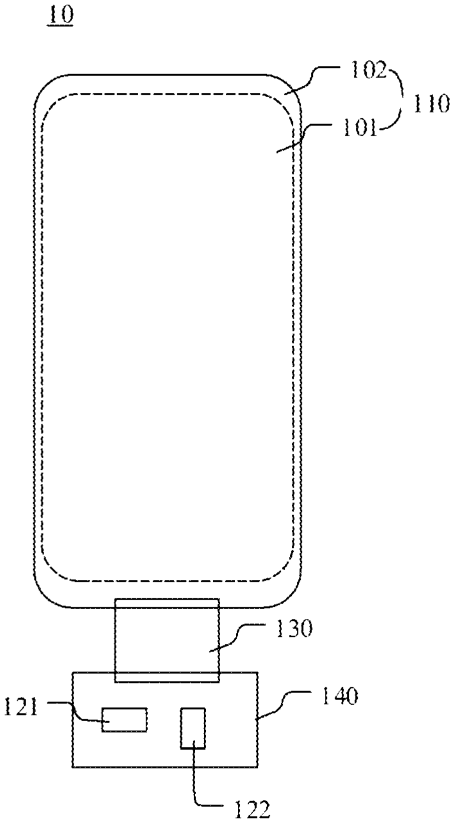
FIG. 2 is a schematic diagram of a display panel and a control mainboard in a terminal according to some embodiments of the present disclosure.
Figure 3:
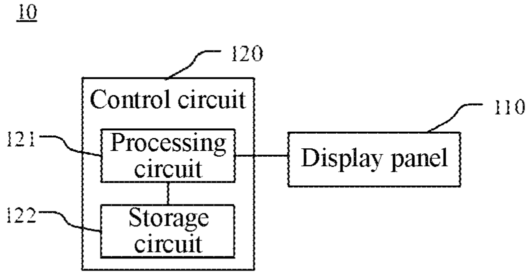
FIG. 3 is a schematic circuit diagram of a terminal according to some embodiments of the present disclosure.

According to embodiments of the present disclosure, there is provided a terminal. The terminal may be a mobile terminal such as a mobile phone or a tablet computer, or may be a wearable device such as a smart watch, as long as an image may be displayed. As shown in FIG. 1 to FIG. 3, the terminal 10 of the present disclosure may include a display panel 110 and a control circuit 120.

The control circuit 120 is connected to the display panel 110, and is configured to control the display panel 110 to display an image according to initial display data and target display data generated based on the initial display data and a correction model when receiving a correction instruction.

According to the terminal of the embodiments of the present disclosure, at least one correction model may be preset based on different protection films, and the correction model corresponds to the degradation degree caused by the protection film to the image. When the initial display data is obtained, the correction function may be started according to the correction instruction; the initial display data may be converted according to the correction model to obtain the target display data; and the display panel 110 may be controlled to display the image according to the target display data, instead of directly displaying the image according to the initial display data. The display effect after the image displayed according to the target display data is superposed with the degradation effect caused by the protection film, may be consistent with the display effect that the image is displayed directly according to the initial display data with no protection film, thus weakening the influence of the protection film on the display effect viewed by the user.

The terminal is described in detail below.

The terminal 10 may display images through its display panel 110. For example, the display panel 110 has a plurality of light-emitting devices. The light-emitting device may be an organic light-emitting diode (OLED) using an organic light-emitting material, or may be a light-emitting diode (LED) using an inorganic light-emitting material, such as a micro light-emitting diode (Micro LED) and a sub-millimeter light-emitting diode (Mini LED), or may be a device such as a quantum dot light-emitting diode (QLED). In addition, the display panel 110 may also be a liquid crystal display panel. The specific structure of the display panel 110 is not specifically limited here, as long as the image can be displayed.

In addition, in order to realize the interaction between the terminal and the user, the display panel 110 may adopt a touch display panel, which may include a display substrate and a touch layer located on a light emitting side of the display substrate. The display substrate may implement image display; and the touch layer may be configured to sense a touch operation, so as to display a specific image according to the touch operation. The touch layer may adopt a capacitive touch structure, for example, a self-capacitive or mutual-capacitive touch structure. Of course, the touch layer may also adopt a resistive touch structure. The structure and touch principle of the touch layer are not specifically limited here, as long as the touch function can be implemented.

In some embodiments of the present disclosure, the display panel 110 being an OLED display panel 110 is taken as an example. The display panel 110 may include a driving backplane and a plurality of light-emitting devices distributed on a side of the driving backplane in an array.

The driving backplane has a driving circuit for driving the light-emitting device to emit light, and the driving circuit may include a pixel circuit and a peripheral circuit. Among them, the pixel circuit may be a pixel circuit such as 7T1C and 3T1C, the structure of which is not specifically limited here, as long as the pixel circuit can drive the light-emitting device to emit light, where nTmC indicates that a pixel circuit includes n transistors (denoted by the letter “T”) and m capacitors (denoted by the letter “C”). The number of the pixel circuits may be the same as the number of the light-emitting devices, and the pixel circuits are connected to the light-emitting devices in a one-to-one correspondence, so as to respectively control the light-emitting devices to emit light. Certainly, the number of the pixel circuits may also be less than the number of the light-emitting devices. For example, the same pixel circuit may also be connected to a plurality of light-emitting devices, and used to drive a plurality of light-emitting devices to emit light simultaneously, which is not specifically limited here.

The display panel 110 may have a plurality of pixels, and each pixel may include a plurality of sub-pixels. For example, a pixel may include three sub-pixels. Each sub-pixel may emit light independently; and the light-emitting colors of the sub-pixels of the same pixel are different from each other. For example, a pixel may include a sub-pixel emitting red light, a sub-pixel emitting green light, and a sub-pixel emitting blue light. A sub-pixel may include a light-emitting device. If different light-emitting devices may emit light of different colors, the light-emitting colors of the sub-pixels are the light-emitting colors of the light-emitting devices. If the light-emitting colors of the light-emitting devices are the same, the sub-pixel may include a light-emitting device and a corresponding color film. That is, the display panel 110 may further include a color film located on a side of the light-emitting device away from the driving backplane, and light-emitting color of the sub-pixel is defined by the light-emitting device and the color film.

The display panel 110 may also be divided into at least a display area 101 and a peripheral area 102 outside the display area 101, and the peripheral area 102 may be a closed or non-closed annular area surrounding the display area 101. Light-emitting devices and pixel circuits connected to the light-emitting devices are provided within the display area 101. The pixel may be located in the display area 101. The peripheral area 102 is provided with a peripheral circuit, and a signal may be output to the pixel circuit through the peripheral circuit to control the light-emitting time sequence and the grayscale of the light-emitting device, so as to cause the display panel 110 to display an image.

Furthermore, the peripheral area 102 and the control mainboard 140 may be connected through the flexible circuit board 130, and the control circuit 120 may be arranged on the control mainboard 140. Taking the terminal being a mobile phone as an example, the control mainboard 140 is a motherboard of the mobile phone. The peripheral region 102 or the flexible circuit board 130 may be provided with a driving chip circuit, and the peripheral circuit and the pixel circuit may be connected to the driving chip circuit. The control circuit 120 may generate display data after being turned on and transmit the display data to the driving chip circuit, and the driving chip circuit may output a control signal to the peripheral circuit and the pixel circuit according to the display data, to control the light emitting device to emit light, so that the display panel 110 may be controlled through the control circuit 120 to display an image. The display data may be used for displaying a video or a static picture, which is not specifically limited here.

In addition, the control circuit 120 may further output a touch driving signal to the touch layer through the driving chip circuit, so as to sense a touch operation. The sensing signal output by the touch layer may also be transmitted to the driving chip circuit, processed by the driving chip circuit, and transmitted to the control circuit 120, so as to determine the touch position and generate a corresponding image.

As shown in FIG. 2 and FIG. 3, the control circuit 120 may include at least a processing circuit 121 and a storage circuit 122. The processing circuit 121 may include a main processing sub-circuit and an image processing sub-circuit, and display data may be transmitted and displayed to the driving chip circuit through the image processing sub-circuit. The main processing sub-circuit and the image processing sub-circuit may be integrated on a same chip, or may be separate and independent circuits. For example, the main processing sub-circuit may be a central processor, and the image processing sub-circuit may be a graphics processor. The storage circuit 122 is configured to store information required by the processing circuit 121 to display an image, for invoking.

The control circuit 120 may generate display data and control the display panel 110 to display an image according to the display data. In the case that the display panel 110 is not provided with a protection film, the user may view the undegraded image from the display panel 110 due to the absence of the influence of the protection film. In the case that the display panel 110 is provided with a protection film, such as an anti-blue light film, a peep-proof film, or the like, the brightness of the light emitted from the display panel 110 may be reduced after passing through the protection film, and color defects such as color cast may also occur, so that the image viewed by the user is actually a degraded image, which is different from the undegraded image.

Figure 10:
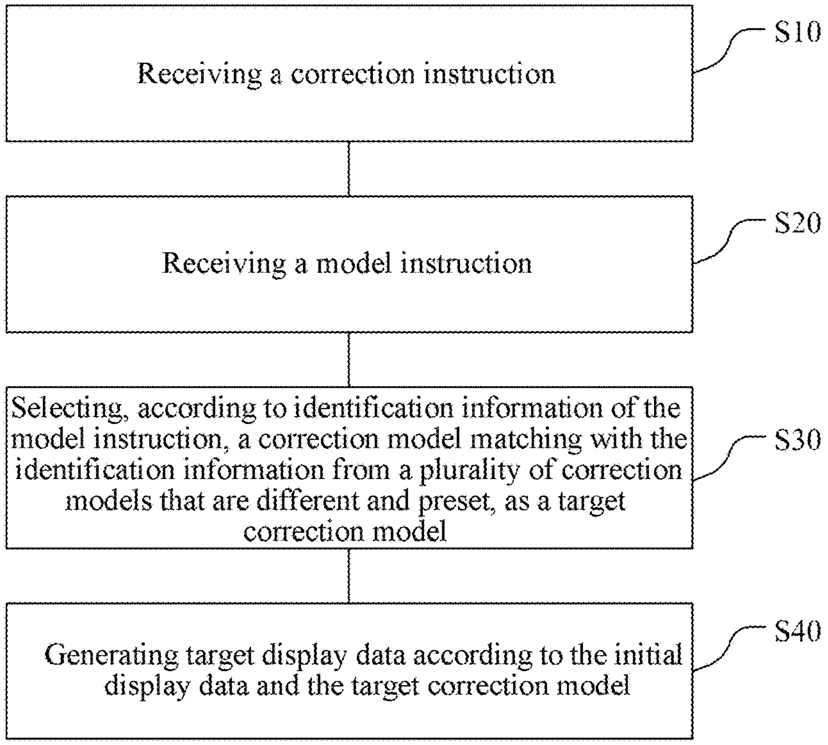
FIG. 10 is a flowchart of a control method according to some embodiments of the present disclosure.

As shown in FIG. 10, in some embodiments of the present disclosure, the display data generated by the control circuit 120 may be used as initial display data. After receiving the initial display data, an image is not directly displayed according to the initial display data, but whether a correction instruction is received is detected. If the correction instruction is received, the initial display data may be converted into the target display data through the correction model, and the display panel 110 may be controlled to display the image according to the target display data.

The correction model is generated by training through a certain generation method in advance, and is stored. For example, the correction model may be stored in the memory of the control circuit in advance through burning or other manners, for invoking. A correction model may correspond to a degradation effect of a protection film on an image. The initial display data may be converted according to the correction model to obtain target display data, and the target display data is different from the initial display data. The control circuit controls the display panel to display the image according to the target display data. After the image is superimposed with the degradation effect of the protection film, the user may view the undegraded image, so as to achieve or approach the display effect with no protection film.

The number of the correction models may be two or more, and the number of the correction models depends on the types of protection films that can be attached to the display panel. For example, the number of the correction models are four, respectively corresponding to the anti-blue light film, the peep-proof film, the anti-blue light plus peep-proof film, and the frosted film. Different correction models provide different conversion results for the initial display data. Correspondingly, the terminal may respectively provide correction for the four protection films. If the display effect that another type of protection film is attached is to be corrected, a correction model may be added. Certainly, there may be only one correction model, and only the display effect of one type of protection film is to be corrected. Certainly, the same correction mode may also be used for correction of a plurality types of protection films.

Figure 4:
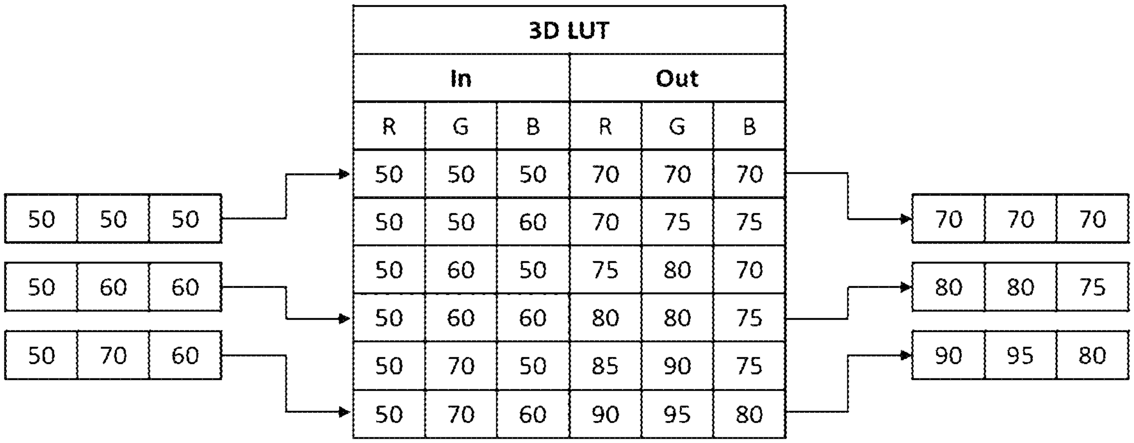
FIG. 4 is a schematic diagram of a 3D-LUT model used for grayscale information conversion of pixels in a terminal according to some embodiments of the present disclosure.
Figure 5:
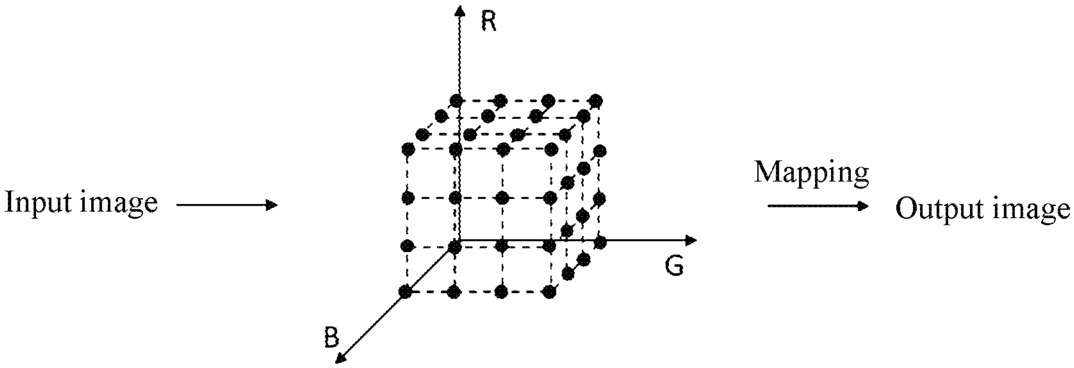
FIG. 5 is a schematic diagram of a 3D-LUT model for a terminal according to some embodiments of the present disclosure.

As shown in FIG. 4 and FIG. 5, in some embodiments of the present disclosure, the correction model may adopt a 3D-LUT, that is, a three-dimensional lookup table. Taking a frame as an example, the initial display data may include grayscale information corresponding to each pixel. The 3D-LUT may include new grayscale information corresponding to at least some pixels in the initial display data. The new grayscale information of at least some pixels, i.e., the target display data, may be directly obtained based on the initial display data and the 3D-LUT through the lookup table. Meanwhile, in order to reduce the computation amount, the 3D-LUT may only include new grayscale information of some pixels, and new grayscale information of other pixels may be obtained through calculation by using an interpolation algorithm. Certainly, for the grayscale information of each pixel in the initial display data, new grayscale information may be set in the 3D-LUT, without performing interpolation calculation.

Taking a pixel including three sub-pixels with different colors as an example, the colors are respectively red (R), green (G) and blue (B), and the three-dimensional lookup table may be represented by the following formula:

$$U = \{\mu^{c}_{(i,j,k)} \mid i, j, k = 0,1,2, \ldots , N, c \in \{r, g, b\}\},$$

where, i, j, and k are coordinates of the three colors in a color space system, which may reflect grayscale information of different colors.

The pixels of the input image may be expressed as:

$$\{I^{r}_{(i,j,k)}, I^{g}_{(i,j,k)}, I^{b}_{(i,j,k)}\}.$$

The pixels of the output image may be expressed as:

$$\{O^c_{(i,j,k)} \mid c \in \{r, g, b\}\} = \mu^c_{(i,j,k)}\{I^r_{(i,j,k)}, I^g_{(i,j,k)}, I^b_{(i,j,k)}\}.$$

Since the 3D-LUT is used for performing lookup in a table based on the grayscale information of the pixel, that is, performing lookup in a table based on the grayscale information of a group of sub-pixels, instead of performing lookup in a table based on the grayscale information of a single sub-pixel, as shown in FIG. 4, compared to the input grayscale information, the grayscale information of the three sub-pixels of the output pixel changes by taking the pixel as a unit. For example, the input values of the sub-pixels of a pixel is 50, 50, 50, respectively, and the corresponding output values are 70, 70, 70. If the input values change to 50, 50, 60, the corresponding output values are 80, 80, 75. It can be seen that, in this way, the correlation of the grayscales of the sub-pixels of the same pixel may be better reflected, which is not only beneficial to correction of the brightness, but also is beneficial to storing color information such as saturation and subjective information such as detail preference, so as to realize correction of the brightness and color of the image.

The correction model may adopt a 1D lookup table, which may only include new grayscale information of some sub-pixels, and new grayscale information of other sub-pixels may be obtained through calculation by using an interpolation algorithm. Certainly, for the grayscale information of each sub-pixel in the initial display data, new grayscale information may be set in the 1D lookup table, without performing interpolation calculation.

The correction model may also be a convolutional neural network model, such as a residual network (ResNet), a dense network (DenseNet), a U-shaped network (Unet), or the like. In some embodiments of the present disclosure, the correction model may be established by using a network model such as a residual network (ResNet), a dense network (DenseNet), or a U-shaped network (Unet), in combination with an attention mechanism (Attention).

Figure 6:
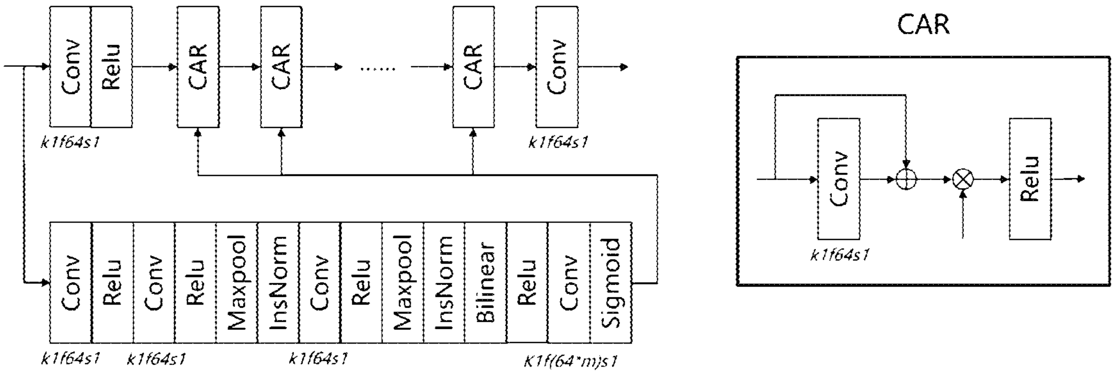
FIG. 6 is a schematic diagram of a correction model for a terminal according to some embodiments of the present disclosure.

In some embodiments of the present disclosure, as shown in FIG. 6, FIG. 6 shows a network structure of a correction model, where Conv is a convolutional layer, k1f64s1 is a convolution kernel size, k is 1, the feature layer number f is 64, and the step size s is 1. The model structure in FIG. 6 may adopt a 1×1 convolution. By taking a pixel as a basic unit, point-to-point space mapping is performed on the initial display information. CAR residual structure (a self-residual structure) is used, which achieves the ability of the residual without introducing additional computation amounts, effectively improving the training efficiency of the model. An attention mechanism network (the second row in FIG. 6) is introduced, where the feature layer number in the final output of the network is f=64 m, and m is the number of CAR modules. Then the 64 m feature layers are respectively multiplied by the output of the self-residual structure in the CAR as coefficients, for performing finer coefficient correction on the trunk network. In addition, Relu is a first activation function layer, Maxpoo is a pooling layer, InsNorm is a normalization layer, Bilinear is a bilinear layer, and Sigmoid is a second activation function layer.

The attention mechanism network described above may be used to perform global feature extraction on the initial display information, and map the extracted feature parameters to the first row of the truck network though Sigmoid, to realize correction of the truck network. Global correction of the truck network may be performed by using global information of the image, so that it may be better adapted to color mapping for different styles and different contents (for example, daytime, night, TV drama, movie, variety or the like may be well matched). In addition, the model is simple in structure, and mostly uses a 1×1 structure; and the second row is calculated at a relatively smaller resolution, and is therefore also suitable for integration of the terminal.

Figure 7:
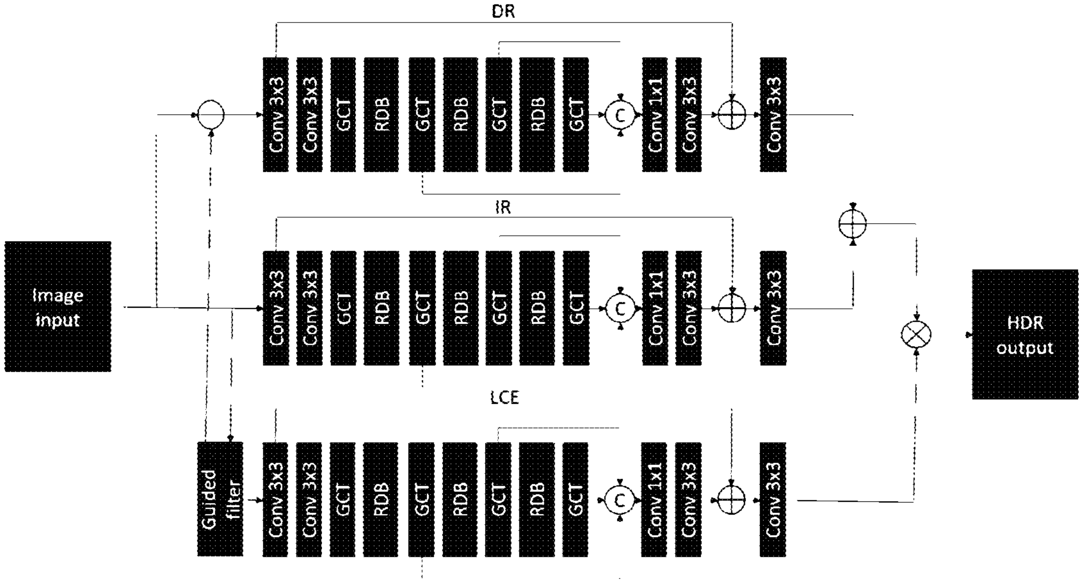
FIG. 7 is a schematic diagram of another correction model for a terminal according to some embodiments of the present disclosure.

In some other embodiments of the present disclosure, as shown in FIG. 7, conv 3×3 is a convolutional layer with a convolution kernel of 3, and RDB is a network combined with a residual network and a dense network. GCT represents an attention mechanism. Guided filter is a guided filter. The correction model may consist of three parts, i.e., image reconstruction (IR), detail recovery (DR), and low contrast enhancement (LCE). IR may realize basic HDR (High Dynamic Range Imaging, i.e., color mapping); DR enriches the texture details of the initial display information on the basis of IR; and LCE may perform finer contrast adjustment on the corrected image by using the guided filter for time brightness balance.

In some other embodiments of the present disclosure, after receiving the initial display data, the image is not displayed directly according to the initial display data, but whether the correction instruction is received is detected. If the correction instruction is received, whether the model instruction is received is further detected. If the model instruction is received, a matched correction model is selected from the preset correction models according to the identification information of the model instruction. For example, each correction model has unique identification information; and according to the identification information of the model instruction, a corresponding correction model having the same identification information as the identification information of the model instruction may be found, thus realizing the selection of the correction model.

Certainly, after the initial display data is received, if any one of the correction instruction and the model instruction is not received, the image may be displayed according to the initial display data.

By controlling the above-mentioned correction instruction and the model instruction, the selection of the display mode may be realized. The correction instruction and the model instruction may both be generated based on the specified operations of the user, and the specified operations for the correction instruction and the model instruction may be different operations.

In some implementations of the present disclosure, when receiving a setting instruction, the control circuit may control the display panel to generate a setting interface, where the setting interface may include a first interaction control and a second interaction control. The correction instruction may be generated based on a specified operation of the user on the first interaction control, and the model instruction may be generated based on a specified operation of the user on the second interaction control. Furthermore, when the correction instruction is not generated, the second interaction control may be locked; that is, when the specified operation is not performed on the first interaction control, the second interaction control is in an inoperable state, and at this time, the model instruction cannot be generated.

The setting instruction may be generated by clicking a specific control in the screen of the display panel. For example, a setting option in a setting control may be selected in the screen through a touch operation, so as to enter the setting interface.

Figure 8:
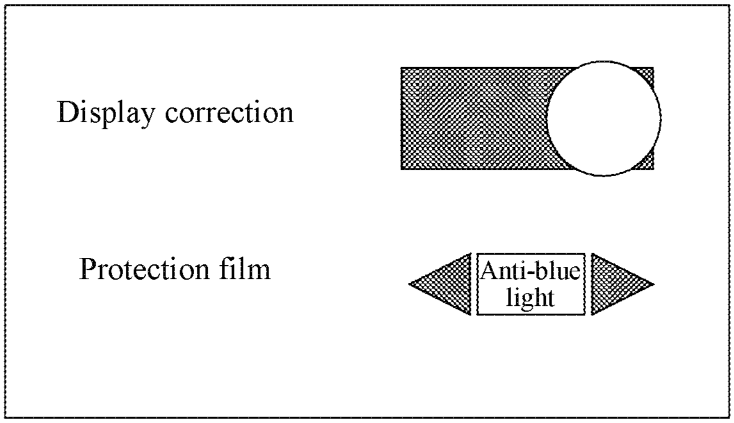
FIG. 8 is a second interface diagram for generating a first interaction control and a second interaction control in a terminal according to some embodiments of the present disclosure.
Figure 9:
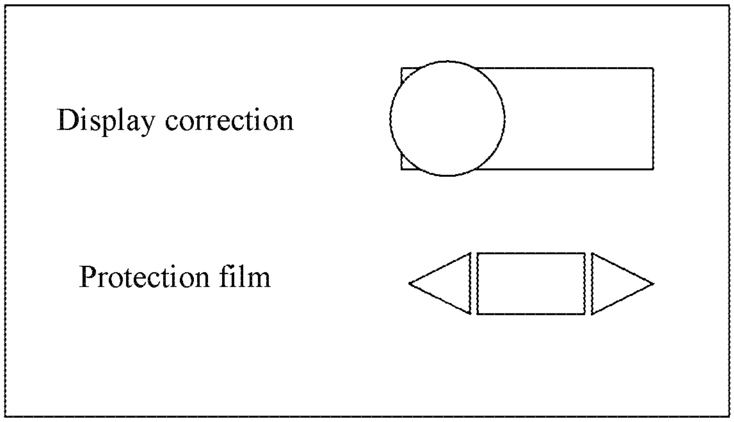
FIG. 9 is a first interface diagram for generating a first interaction control and a second interaction control in a terminal according to some embodiments of the present disclosure.

As shown in FIG. 8 and FIG. 9, the presentation manner of the first interaction control in the setting interface may be a slidable button, and switch between the correction mode and the non-correction mode may be implemented through sliding of the button. Of course, the first interaction control may also be a menu with a correction option and a non-correction option, or the like, which is not specifically limited here.

As shown in FIG. 8 and FIG. 9, the presentation manner of the second interaction control may be a plurality of options that may be selected through an arrow and switched through scrolling; and each option corresponds to a protection film, so as to correspond to a correction model. By switching the options, a correction model may be selected. A correction model may correspond to a display mode. As shown in FIG. 8, an anti-blue light film is selected for the protection film in FIG. 8. Certainly, other protection films may also be selected, such as a tempered film, a peep-proof film, an anti-blue light plus peep-proof film, etc. In view of related industry standards, the method provided in the embodiments may ensure that the display effects of the terminal before and after the protection film are attached are consistent with each other. In addition, the second interaction control may also be a menu with a plurality of options for protection films, as long as the selection of the correction model can be implemented, the presentation manner of which is not specifically limited here. Among them, when a user selects an option, a mode instruction may be generated, where the mode instruction has unique identification information, and identification information of different mode instructions generated when different options are selected is different from each other, so as to select different correction models.

The processing circuit 121 may be configured to: generate the initial display data, obtain the correction instruction and the model instruction, and select a correction model matching with the identification information according to the identification information of the mode instruction.

In addition, as shown in FIG. 9, if the correction instruction is not generated through the first interaction control, the second interaction control may be turned off. For example, the button of display correction in FIG. 9 is in an off state, and at this time, the correction instruction is not sent; correspondingly; the arrows and the option for selecting the protection films are also turned off, and are in an inoperable state. As shown in FIG. 8, when the button of display correction is in an on state, the correction instruction is sent, and the arrows and the option for selecting the protection films are also turned on for the user to select.

The embodiments of the present disclosure further provide a control method for a terminal according to any of the above embodiments. The structure and related content of the terminal have been described in detail above, and are not described in detail here. The control method may include step S110 and step S120.

In step S110, a correction instruction is received, and target display data is generated according to the initial display data and a correction model.

In step S120, the display panel is controlled to display an image according to the target display data.

According to the control method of the present disclosure, at least one correction model may be preset based on different protection films, and the correction model corresponds to the degradation degree caused by the protection film to the image. When the initial display data is obtained, the correction function may be started according to the correction instruction; the initial display data may be converted according to the correction model to obtain the target display data; and the display panel is controlled to display the image according to the target display data, instead of directly displaying the image according to the initial display data. The display effect after the image displayed according to the target display data is superposed with the degradation effect caused by the protection film, may be consistent with the display effect that the image is displayed directly according to the initial display data with no protection film, thus weakening the influence of the protection film on the display effect viewed by the user.

In some implementations of the present disclosure, step S110 may include step S1110 and step S1120.

In step S1110, the correction instruction and the model instruction are received, and a correction model is selected, from a plurality of correction models that are preset and different from each other according to the identification information of the model instruction, as a target correction model.

As shown in FIG. 10, after receiving the initial display data, the image is not displayed directly according to the initial display data, but whether the correction instruction is received is detected. If the correction instruction is received, whether the model instruction is received is further detected. If the model instruction is received, a matched correction model is selected from the preset correction models according to the identification information of the model instruction. For example, each correction model has unique identification information; and according to the identification information of the model instruction, a corresponding correction model having the same identification information as the identification information of the model instruction may be found, thus realizing the selection of the correction model.

In step S1120, target display data is generated according to the initial display data and the target correction model.

The initial display data may be converted according to the correction model to obtain target display data, and the target display data is different from the initial display data. The control circuit controls the display panel to display the image according to the target display data. After the image is superimposed with the degradation effect of the protection film, the user may view an undegraded image, so as to achieve or approach the display effect with no protection film.

In some other embodiments of the present disclosure, after receiving the initial display data, the image is not displayed directly according to the initial display data, but whether the correction instruction is received is detected. If the correction instruction is received, the initial display data may be converted into the target display data by using the correction model, and the display panel is controlled to display the image according to the target display data.

In some embodiments of the present disclosure, in step S1110, receiving the correction instruction and the model instruction may include step S210 to step S230.

In step S210, a setting instruction is received, and the display panel is controlled to generate a setting interface, where the setting interface includes a first interaction control and a second interaction control.

In step S220, in response to an operation of a user on the first interaction control, the correction instruction is generated.

In step S230, in response to an operation of the user on the second interaction control, the model instruction is generated.

When receiving a setting instruction, the control circuit may control the display panel to generate a setting interface, where the setting interface may include a first interaction control and a second interaction control. The correction instruction may be generated based on a specified operation of the user on the first interaction control, and the model instruction may be generated based on a specified operation of the user on the second interaction control. Furthermore, when the correction instruction is not generated, the second interaction control may be locked; that is, when the specified operation is not performed on the first interaction control, the second interaction control is in an inoperable state, and at this time, the model instruction cannot be generated.

The setting instruction may be generated by clicking a specific control in the screen of the display panel. For example, a setting option in a setting control may be selected in the screen through a touch operation, so as to enter the setting interface.

The presentation manner of the second interaction control may be a plurality of options that may be selected through an arrow and switched through scrolling; and each option corresponds to a protection film, so as to correspond to a correction model. By switching the options, a correction model may be selected. A correction model may correspond to a display mode.

Certainly, the second interaction control may also be a menu with a plurality of options for protection films, as long as the selection of the correction model can be implemented, the presentation manner of which is not specifically limited here. Among them, when a user selects an option, a mode instruction may be generated, where the mode instruction has unique identification information, and identification information of different mode instructions generated when different options are selected is different from each other, so as to select different correction models.

The details of the control method of the present disclosure have been described in detail in the above embodiments of the terminal, which will not be repeated here.

The control method for a terminal of the present disclosure may further include a generation method for a correction model, and the correction model may be generated based on a degradation model. Therefore, the control method may further include a generation method for the degradation model, and the generation method for the degradation model is described below.

Figure 11:
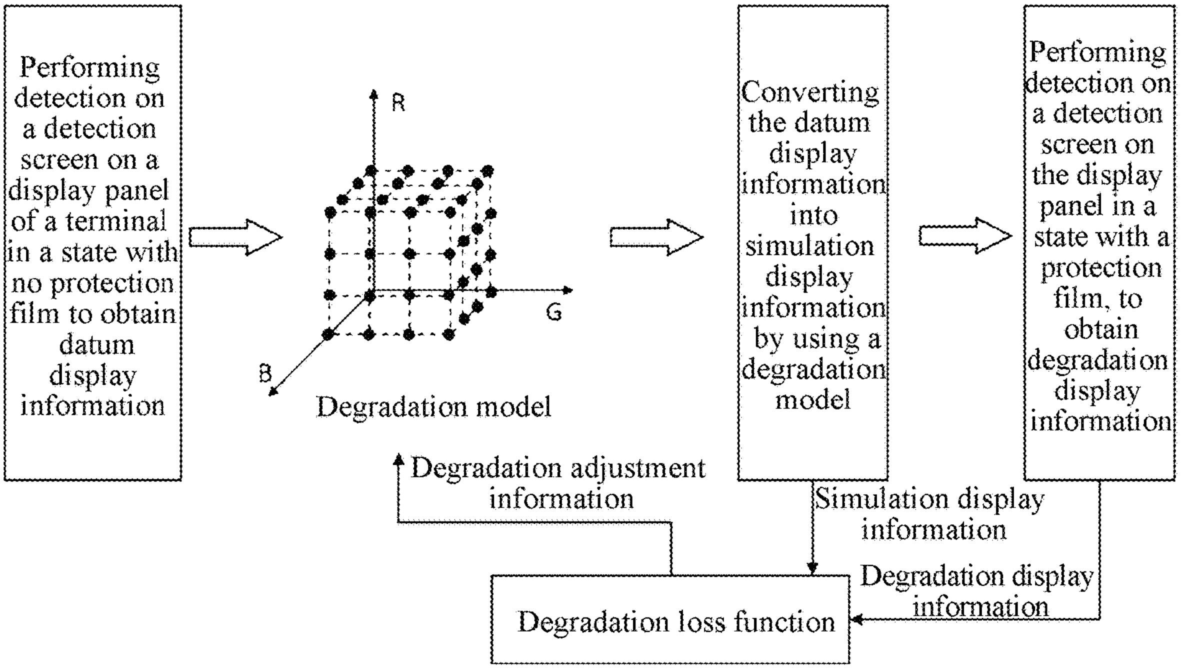
FIG. 11 is a flowchart of a generation method for a degradation model according to some embodiments of the present disclosure.

As shown in FIG. 11, the generation method for a degradation model according to embodiments of the present disclosure may include steps S310 to S340.

In step S310, detection is performed on a detection screen displayed by a display panel of a terminal in a state with no protection film to obtain datum display information.

In the case with no protection film, the display panel may be caused to display a detection screen. The detection screen may be one or more static pictures, or may be a continuous video. Detection may be performed on the screen of the display panel by using an optical detection apparatus such as a camera, to obtain display information as datum display information. The display information may include brightness information and color information, of course, may only include one of the brightness information and the color information. The color information may include saturation, color cast, etc.

In step S320, detection is performed on a detection screen displayed by the display panel of the terminal in a state with a protection film, to obtain degradation display information.

As shown in FIG. 11, the protection film may be an anti-blue light film, a peep-proof film, or the like, which is not specifically limited here. In the case with a protection film, the display panel may still be caused to display a detection screen, and the detection screen is the same as the detection screen in step S310. Detection may be performed on the detection screen by using an optical detection apparatus, to obtain the display information as degradation display information. Due to the influence of the protection film, there is a difference between the viewing effect of the user and the display effect with no protection film, so that the degradation display information is different from the datum display information.

In step S330, the datum display information is converted into simulation display information by using a degradation model, where the simulation display information is different from the datum display information.

As shown in FIG. 11, the simulation display information is not obtained by performing detection on the display panel, but is obtained by converting the datum display information by using the degradation model; and there may be a difference between the simulation display information and the degradation display information before any update is performed on the degradation model. The initial degradation model may be generated according to empirical data, or may be generated randomly or in other manners. Since training, i.e., circular update, may be performed on the degradation model in subsequent steps, the difference between the degradation display information and the simulation display information obtained based on the initial degradation model may not be required.

In step S340, the degradation model is updated according to the difference between the simulation display information and the degradation display information, until the difference between the simulation display information and the degradation display information reaches a specified condition, and the degradation model is output.

As shown in FIG. 11, the degradation display information obtained through actual detection may be used as a reference, and may be compared with the simulation display information. The degradation model is updated according to the difference between the simulation display information and the degradation display information, until the difference between them reaches a specified condition, then the degradation model is output, so that the influence of the protection film on the display information may be simulated through the degradation model. The specified condition may be that the degradation display information is the same as the simulation display information, or that the difference between them is less than a certain range, for example, less than 10%.

In some implementations of the present disclosure, step S340 may include step S3410 and step S3420.

In step S3410, degradation adjustment information is determined according to the simulation display information, the degradation display information, and a degradation loss function. As shown in FIG. 11, the degradation loss function may be a loss function L1, a loss function MSE, or the like, which is not specifically limited here. Loss function calculation may be performed on the simulation display information and the degradation display information to obtain degradation adjustment information. The degradation adjustment information may include weights of different information in the degradation model, such as a weight of brightness, a weight of a certain color, or the like.

In step S3420, the degradation model is updated according to the degradation adjustment information.

As shown in FIG. 11, the parameters in the degradation model may be updated, increased or decreased according to the weight in the degradation adjustment information, to obtain an updated degradation model. The simulation display information may be re-generated according to the updated degradation model, step S340 may be performed again until the difference between the simulation display information and the degradation display information reaches a specified condition, and then, the required degradation model may be obtained and output.

The degradation model may adopt a 3D-LUT or a convolutional neural network model, and the model structure of the degradation model may refer to the model structure of the correction model above, which is not described in detail here.

Figure 12:
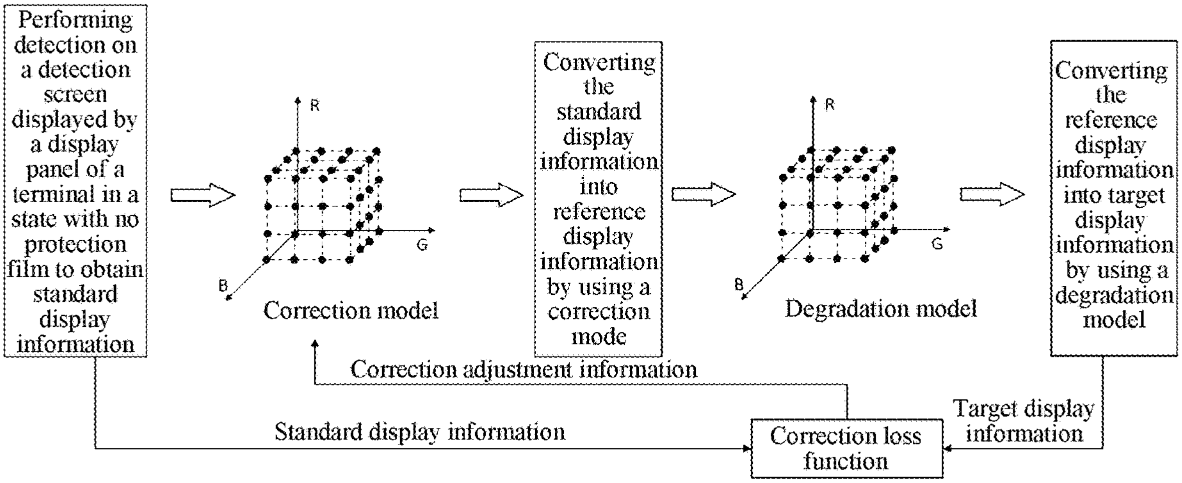
FIG. 12 is a flowchart of a generation method for a correction model according to some embodiments of the present disclosure.

As shown in FIG. 12, according to embodiments of the present disclosure, there is further provided a generation method for a correction model, which may include steps S410 to S440.

In step S410, detection is performed on a standard detection screen displayed by a display panel of a terminal in a state with no protection film to obtain standard display information.

In the case with no protection film, the display panel may be caused to display a standard detection screen. The standard detection screen may be one or more static pictures, or may be a continuous video. Detection may be performed on the screen of the display panel by using an optical detection apparatus such as a camera, to obtain display information as standard display information. The display information may include brightness information and color information, of course, may only include one of the brightness information and the color information. The color information may include saturation, color cast, etc.

In step S420, the standard display information is converted into reference display information by using a correction model, where the reference display information is different from the standard display information.

As shown in FIG. 12. the correction model may be a 3D-LUT or a convolutional neural network model, and the model structure of the correction model may refer to the description of the correction model in the foregoing implementations of the terminal, which is not described in detail here. The correction model in step S420 may be an initial correction model, and is not the final correction model used in the foregoing control methods. The standard display information may be used as input information, and reference display information may be generated through the correction model. The reference display information is not obtained by performing detection on the display panel, but is obtained by converting the standard display information by using the correction model, and there may be a difference between the reference display information and the standard display information before any update is performed on the correction model. The initial correction model may be generated according to empirical data, or may be generated randomly or in other manners. Since training, i.e., circular update, may be performed on the correction model in subsequent steps, the difference between the standard display information and the reference display information obtained based on the initial correction model may not be required.

In step S430, the display panel is controlled to display a reference detection screen according to the reference display information, and detection is performed on the reference detection screen of the display panel of the terminal in a state with a protection film to obtain comparison display information.

As shown in FIG. 12, the protection film may be an anti-blue light film, a peep-proof film, or the like, which is not specifically limited here. In the case with a protection film, the display panel may be caused to display the reference detection screen based on the reference display information. Detection may be performed on the reference detection screen by using the optical detection apparatus to obtain the display information as the comparison display information. Due to the influence of the protection film, there may be a difference between the viewing effect of the user and the display effect with no protection film, so that the comparison display information is different from the standard display information.

In step S440, the correction model is updated according to the difference between the standard display information and the comparison display information until the difference between the comparison display information and the standard display information reaches a specified condition, and the correction model is output.

As shown in FIG. 12, the comparison display information may be compared with the standard display information. The correction model may be updated according to the difference between the comparison display information and the standard display information until the difference between them reaches a specified condition, and then the correction model is output, so that the initial display information may be corrected through the correction model. The influence of the protection film on the screen is compensated in advance, so that the display effect viewed by the user in the case with a protection film is consistent with or nearly consistent with the display effect in the case with no protection film. The specified condition may be that the comparison display information is the same as the standard display information, or that the difference between them is less than a certain range, for example, less than 10%.

Figure 13:
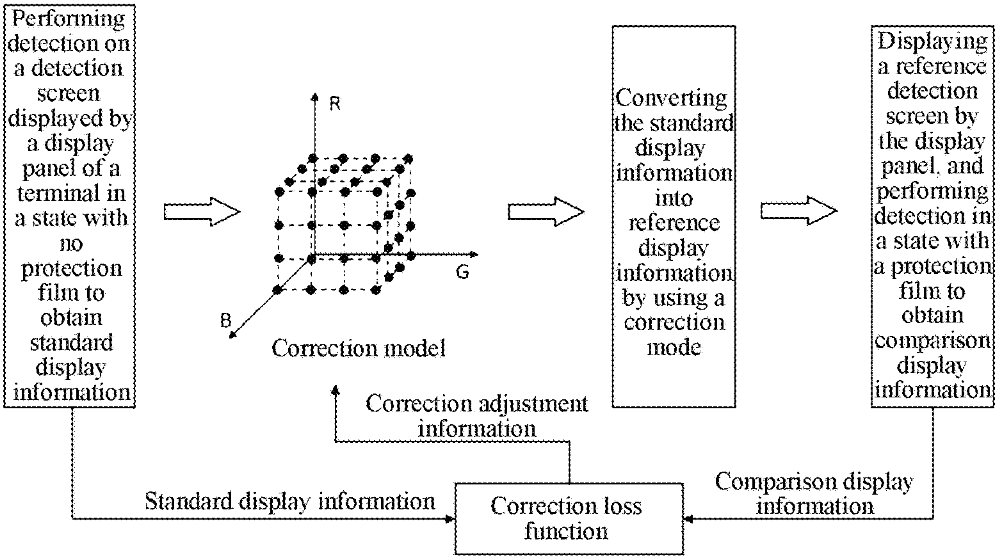
FIG. 13 is a flowchart of a generation method for a correction model according to some embodiments of the present disclosure.

As shown in FIG. 13, based on the degradation model of any of the above embodiments, according to the embodiments of the present disclosure, there is further provided another generation method for a correction model, which may include steps S510 to S540.

In step S510, detection is performed on a detection screen displayed by a display panel of a terminal in a state with no protection film to obtain standard display information.

As shown in FIG. 13, in the case with no protection film, the display panel may be caused to display a standard detection screen. The standard detection screen may be one or more static pictures, or may be a continuous video. Detection may be performed on the screen of the display panel by using an optical detection apparatus such as a camera, to obtain display information as standard display information. The display information may include brightness information and color information, of course, may only include one of the brightness information and the color information. The color information may include saturation, color cast, etc.

In step S520, the standard display information is converted into reference display information by using a correction model, where the reference display information is different from the standard display information.

As shown in FIG. 13, the correction model may be a 3D-LUT or a convolutional neural network model, and the model structure of the correction model may refer to the description of the correction model in the foregoing implementations of the terminal, which is not described in detail here. The correction model in step S520 may be an initial correction model, and is not the final correction model used in the foregoing control methods. The standard display information may be used as input information, and reference display information may be generated through the correction model. The reference display information is not obtained by performing detection on the display panel, but is obtained by converting the standard display information by using the correction model, and there may be a difference between the reference display information and the standard display information before any update is performed on the correction model. The initial correction model may be generated according to empirical data, or may be generated randomly or in other manners. Since training, i.e., circular update, may be performed on the correction model in subsequent steps, the difference between the standard display information and the reference display information obtained based on the initial correction model may not be required.

In step S530, the reference display information is converted into target display information by using a degradation model, where the target display information is different from the reference display information.

As shown in FIG. 13, the manner of generating the degradation model has been described above, and details are not described here again. The display effect in the case with a protection film may be simulated through the degradation model, that is, the reference display information may be converted into target display information through the degradation model. The target display information obtained through simulation of the degradation model may be used to replace the display information actually detected in the case with a protection film, which is beneficial to improving the efficiency.

In step S540, the correction model is updated according to a difference between the target display information and the standard display information until the difference between the target display information and the standard display information reaches a specified condition, and the correction model is output.

As shown in FIG. 13, the target display information may be compared with the standard display information. The correction model may be updated according to the difference between the target display information and the standard display information until the difference between the target display information and the standard display information reaches a specified condition, which indicates that the reference display information converted by the correction model is sufficient to compensate the degradation effect caused by the protection film. At this time, the correction model may be output, so that the initial display information may be corrected through the correction model. The influence of the protection film on the screen is compensated in advance, so that the display effect viewed by the user in the case with a protection film is consistent with or nearly consistent with the display effect in the case with no protection film. The specified condition may be that the comparison display information is the same as the standard display information, or that the difference between them is less than a certain range, for example, less than 10%.

As shown in FIG. 13, in some implementations of the present disclosure, step S540 may include steps S5410 and S5420.

In step S5410, correction adjustment information is determined according to the target display information, the standard display information, and a correction loss function.

The correction loss function may be a loss function L1, a loss function MSE, or the like, which is not specifically limited here. Loss function calculation may be performed on the target display information and the standard display information to obtain correction adjustment information. The correction adjustment information may include weights of different information in the correction model, such as a weight of brightness, a weight of a certain color, or the like.

In step S5420, the correction model is updated according to the correction adjustment information.

The parameters in the correction model may be updated, increased or decreased according to the weight in the correction adjustment information, to obtain an updated correction model. The reference display information may be regenerated according to the updated correction model, step S530) and step 540 may be performed again until the difference between the target display information and the standard display information reaches a specified condition, and then the required correction model may be obtained and output.

According to embodiments of the present disclosure, there is further provided a computer-readable storage medium, on which a computer program is store. When the computer program is executed by a processor, at least one of the foregoing control method and generation method is implemented.

Through the description of the foregoing implementations, those skilled in the art may easily understand that the example implementations described here may be implemented by software, or may be implemented by software in combination with necessary hardware. Therefore, the technical solutions according to the embodiments of the present disclosure may be embodied in the form of a program product, and the program product may be stored in a non-volatile storage medium (which may be a CD-ROM, a USB flash disk, a mobile hard disk, etc.) or a network, and includes several instructions to cause a computing device (which may be a personal computer, a server, a mobile terminal, or a network device, etc.) to execute the control method and the generation method according to the embodiments of the present disclosure.

It should be noted that although various steps of the method in the present disclosure are described in a specific order in the accompanying drawings, this does not require or imply that the steps must be performed in the specific order, or all the steps shown must be performed to achieve the desired result. Additionally or alternatively, some steps may be omitted, a plurality of steps may be combined into one step for execution, and/or one step may be decomposed into a plurality of steps for execution.

Other embodiments of the present disclosure will be apparent to those skilled in the art from consideration of the specification and practice of the present disclosure here. The present disclosure is intended to cover any variations, uses, or adaptations of the present disclosure following the general principles of the present disclosure and including common general knowledge or conventional technical means in the art that are not disclosed in the present disclosure. It is intended that the specification and examples may be considered as examples only, with a true scope and spirit of the present disclosure being indicated by the following claims.

What is claimed is:

1. A terminal, comprising:

a display panel; and a control circuit, connected to the display panel and configured to control the display panel to display an image according to initial display data and target display data generated based on the initial display data and a correction model when receiving a correction instruction and a model instruction, wherein the model instruction comprises identification information matching with the correction model, and the correction model matching with the identification information is a correction model among a plurality of correction models that are preset and different from each other.

2. The terminal according to claim 1, wherein the control circuit comprises:

a storage circuit, storing with the plurality of correction models; and a processing circuit, configured to obtain the correction instruction and the model instruction, and select the correction model matching with the identification information.

3. The terminal according to claim 2, wherein the correction model is used for performing correction on a display effect of the terminal with a protection film to ensure the display effect of the terminal with the protection film to be consistent with a display effect of the terminal with no protection film.

4. The terminal according to claim 1, wherein the control circuit is further configured to control the display panel to generate a setting interface when receiving a setting instruction, and the setting interface comprises a first interaction control and a second interaction control; and the control circuit is further configured to generate the correction instruction based on an operation of a user on the first interaction control, and generate the model instruction based on an operation of a user on the second interaction control.

5. The terminal according to claim 4, wherein the correction model is used for performing correction on a display effect of the terminal with a protection film to ensure the display effect of the terminal with the protection film to be consistent with a display effect of the terminal with no protection film.

6. The terminal according to claim 1, wherein the correction model is used for performing correction on a display effect of the terminal with a protection film to ensure the display effect of the terminal with the protection film to be consistent with a display effect of the terminal with no protection film.

7. A control method for a terminal, wherein the terminal comprises a display panel, and the control method comprises:

receiving a correction instruction and a model instruction, and selecting, according to identification information of the model instruction, a correction model matching with the identification information from a plurality of correction models that are preset and different from each other, as a target correction model;

generating target display data according to the initial display data and the target correction model; and controlling the display panel to display an image according to the target display data.

8. The control method according to claim 7, wherein receiving the correction instruction and the model instruction comprises:

receiving a setting instruction, and controlling the display panel to generate a setting interface, wherein the setting interface comprises a first interaction control and a second interaction control;

generating the correction instruction in response to an operation of a user on the first interaction control; and generating the model instruction in response to an operation of a user on the second interaction control.

9. The control method according to claim 8, wherein, in response to determining that the correction instruction is not generated, the second interaction control is locked.

10. The control method according to claim 7, wherein the control method further comprises:

obtaining standard display information by performing detection on a standard detection screen displayed by the display panel of the terminal in a state with no protection film;

converting the standard display information into reference display information by using a correction model, wherein the reference display information is different from the standard display information;

controlling the display panel to display a reference detection screen according to the reference display information, and obtaining comparison display information by performing detection on the reference detection screen of the display panel of the terminal in a state with a protection film; and updating the correction model according to a difference between the standard display information and the comparison display information until the difference between the comparison display information and the standard display information reaches a specified condition, and outputting the correction model.

11. The control method according to claim 7, wherein the control method further comprises:

obtaining standard display information by performing detection on a standard detection screen displayed by the display panel of the terminal in a state with no protection film;

converting the standard display information into reference display information by using a correction model, wherein the reference display information is different from the standard display information;

converting the reference display information into target display information by using a degradation model, wherein the target display information is different from the reference display information; and updating the correction model according to a difference between the target display information and the standard display information until the difference between the target display information and the standard display information reaches a specified condition, and outputting the correction model.

12. The control method according to claim 11, wherein updating the correction model according to the difference between the target display information and the standard display information comprises:

determining correction adjustment information according to the target display information, the standard display information, and a correction loss function; and updating the correction model according to the correction adjustment information.

13. The control method according to claim 12, wherein the standard display information comprises at least one of brightness information and color information.

14. The control method according to claim 11, wherein the control method further comprises:

obtaining datum display information by performing detection on a detection screen displayed by the display panel of the terminal in a state with no protection film;

obtaining degradation display information by performing detection on a detection screen displayed by the display panel of the terminal in a state with a protection film;

converting the datum display information into simulation display information by using the degradation model, wherein the simulation display information is different from the datum display information; and updating the degradation model according to a difference between the simulation display information and the degradation display information until the difference between the simulation display information and the degradation display information reaches a specified condition, and outputting the degradation model.

15. The control method according to claim 14, wherein updating the degradation model according to the difference between the simulation display information and the degradation display information comprises:

determining degradation adjustment information according to the simulation display information, the degradation display information and a degradation loss function; and updating the degradation model according to the degradation adjustment information.

16. The control method according to claim 15, wherein at least one of the datum display information, the degradation display information or the simulation display information comprises at least one of brightness information or color information.

17. A non-transitory computer-readable storage medium having a computer program stored thereon, wherein the computer program, when executed by a processor, implements a control method for a terminal, wherein the terminal comprises a display panel, and the control method comprises:

receiving a correction instruction and a model instruction, and selecting, according to identification information of the model instruction, a correction model matching with the identification information from a plurality of correction models that are preset and different from each other, as a target correction model;

generating target display data according to the initial display data and the target correction model; and controlling the display panel to display an image according to the target display data.

* * * * *